United States Patent
Guo

(10) Patent No.: US 8,301,949 B2
(45) Date of Patent: *Oct. 30, 2012

(54) PIPELINED ERROR DETERMINATION IN AN ERROR-CORRECTING COMMUNICATION SYSTEM

(75) Inventor: Shaori Guo, San Jose, CA (US)

(73) Assignee: Telegent Systems, Inc., Sunnyvale, CA (US)

( * ) Notice: Subject to any disclaimer, the term of this patent is extended or adjusted under 35 U.S.C. 154(b) by 649 days.

This patent is subject to a terminal disclaimer.

(21) Appl. No.: 12/556,439

(22) Filed: Sep. 9, 2009

(65) Prior Publication Data

US 2010/0050052 A1 Feb. 25, 2010

Related U.S. Application Data

(62) Division of application No. 11/437,282, filed on May 18, 2006, now Pat. No. 7,610,544.

(60) Provisional application No. 60/682,196, filed on May 18, 2005, provisional application No. 60/682,195, filed on May 18, 2005.

(51) Int. Cl.
*H03M 13/00* (2006.01)

(52) U.S. Cl. ........ 714/746; 714/752; 714/776; 714/780; 370/242; 370/474

(58) Field of Classification Search .................. 714/752, 714/776, 780; 370/242, 474

See application file for complete search history.

(56) References Cited

U.S. PATENT DOCUMENTS

| | | | | |
|---|---|---|---|---|
| 4,438,494 A | * | 3/1984 | Budde et al. | 714/2 |
| 6,192,500 B1 | * | 2/2001 | Yang et al. | 714/786 |
| 7,043,578 B2 | * | 5/2006 | Hufferd | 710/105 |
| 7,496,821 B2 | * | 2/2009 | Stare | 714/751 |
| 7,957,423 B2 | * | 6/2011 | Crookes et al. | 370/474 |
| 2002/0178417 A1 | * | 11/2002 | Jacob et al. | 714/752 |
| 2005/0097429 A1 | * | 5/2005 | Propp et al. | 714/780 |
| 2006/0236210 A1 | * | 10/2006 | Touzni et al. | 714/776 |
| 2006/0268726 A1 | * | 11/2006 | Alamaunu et al. | 370/242 |
| 2006/0282749 A1 | * | 12/2006 | Guo | 714/776 |
| 2009/0055715 A1 | | 2/2009 | Jashek et al. | |

OTHER PUBLICATIONS

Ebu et al., "Digital Broadcasting (DVB)" ETSI Drafts. European Telecommunications Standards Institute, Sophia-Antipo, FR, Sep. 2004, pp. 1-82, XP002388738. ISSN 0000-0002.

(Continued)

*Primary Examiner* — Scott Baderman
*Assistant Examiner* — Jeison C Arcos
(74) *Attorney, Agent, or Firm* — Richard T. Ogawa; Ogawa P.C.

(57) ABSTRACT

A sequence of data packets is received within an integrated circuit device and stored within a first memory thereof. Error descriptor values are updated within a second memory of the integrated circuit device based on error information associated with the sequence of data packets. The error descriptor values each include an address field to specify a corresponding storage region of the first memory and an error field to specify an error status of data values stored within the storage region. A sequence of multiple-bit error values are generated based, at least in part, on the error fields and address fields within respective subsets of the error descriptor values. Concurrently with generation of at least one of the multiple-bit error values the state of one or more bits of the data values stored in the first memory based are changed based on a previously-generated one of the multiple-bit error values.

20 Claims, 8 Drawing Sheets

OTHER PUBLICATIONS

International Search Report and Written Opinion of the International Searching Authority in International Application PCT/US2006/019456, ISA European Patent Office, Oct. 9, 2006, 9 pgs.

Joki H, "Modeling of DVB-H Link Layer," Internet citation [online] May 10, 2005 92005-05-10). XP002389192, retrieved from the Internet, url: http://www.netlab.tkk.fi/opetus/s38310/04-05/Kalvot_04-05/Joki_100505.pp> [retrieved on Jul. 7, 2006].

* cited by examiner (Prior-Art)

(Prior-Art)

(Prior-Art)

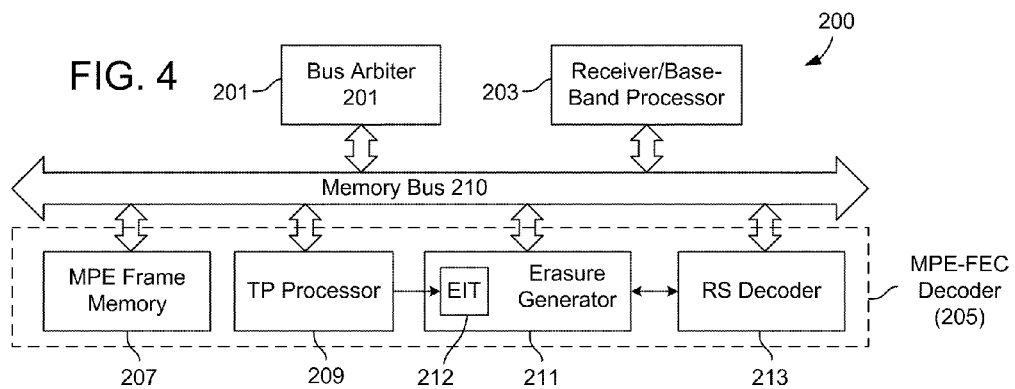
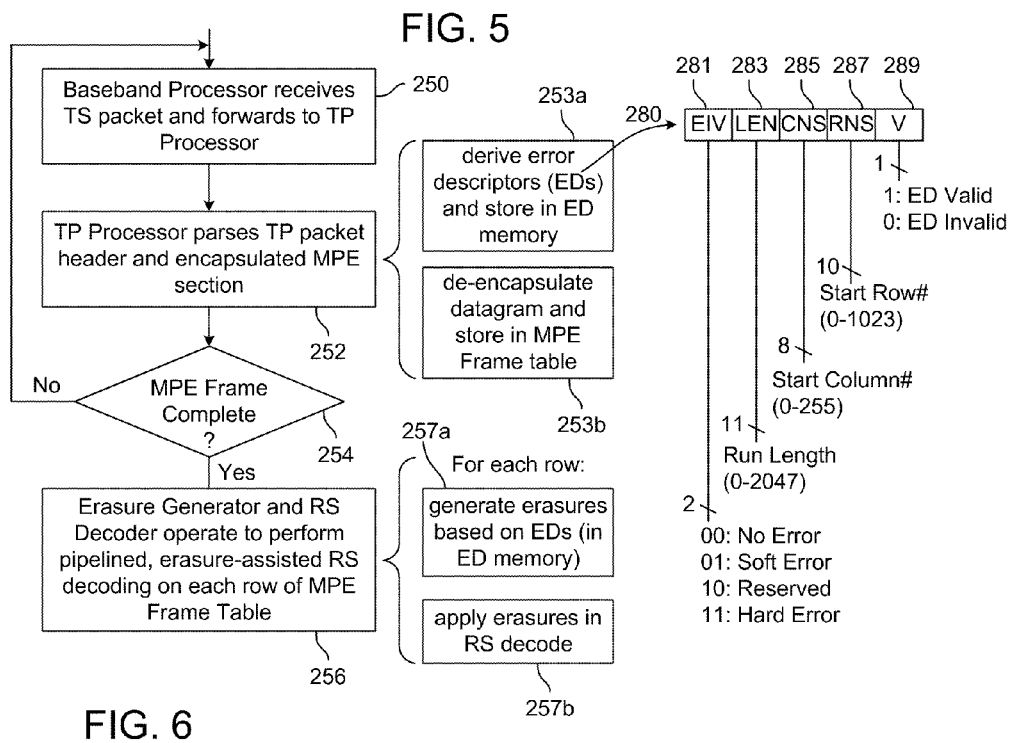
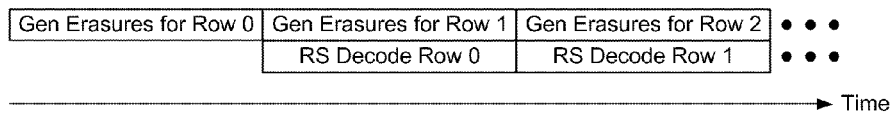

FIG. 8

```
100  ed := 0, tE := '00b'  /* Init temp variables, where ed is error descriptor index, tE is temporary Error state */
110  row := 0, col := 0    /* Init temp variables, where row, col are indices into MPE Frame memory */
120  Reset validity bits in Error Descriptor Memory, Clear MPE Section buffer and Datagram buffer
130  Loop until MPE Frame Complete
140    Get next TS packet
150    If Puncture bit set in TS packet header, then
151      tE := '11b'
152    else if TEI bit set in TS packet header, then
153      tE := tE .or. '01b' {endif 150}
160    if TS packet continuity count <> previous TS packet continuity count, then
161      tE := tE .or. '10b' {endif 160}
170    Add TS Packet payload to current MPE Section
180    If current MPE Section complete, then
190      If MPE Section CRC failure, then
200        tE := tE .or. '01b' {end if 190}
210      Add MPE Section payload to current Datagram
220      Clear MPE Section buffer for construction of next MPE Section
230      If current Datagram complete, then
235        if tE = '10b', then
237          tE = '00b'  {endif 235}  /* no error if TS counter incorrect, but no other transmit/CRC errors */
240        Load Datagram into MPE Frame Memory starting at row, col
250        if ErrDesc[ed].valid = TRUE, then
260          if tE = '00b', then
270            ed := ed + 1
280          else if tE = ErrDesc[ed].eiv .and. ((ErrDesc[ed].len + DatagramLength) <= MaxLength), then
290            ErrDesc[ed].len := ErrDesc[ed].len + DatagramLength
300          else, then  /* tE not equal to ErrDesc[ed].eiv */
310            ed := ed+1
320            ErrDesc[ed].valid := TRUE
330            ErrDesc[ed].eiv := tE
340            ErrDesc[ed].len := DatagramLength
350            ErrDesc[ed].row := row
360            ErrDesc[ed].col := col  {endif 260}
370        else if tE <> '00b', then  /* if current Error Descriptor not valid, update only if error */
380          ErrDesc[ed].valid := TRUE
390          ErrDesc[ed].eiv := tE
400          ErrDesc[ed].len := DatagramLength
410          ErrDesc[ed].row := row
420          ErrDesc[ed].col := col  {endif 250}
430        row := (row + DatagramLength) .mod. MaxRows
440        col := col + (row + DatagramLength) / MaxRows
450        Clear Datagram buffer for construction of next Datagram  {endif 230} {endif 180} {EndLoop 130}
```

FIG. 10

```
100  i := 0   /* Initialize Loop Index */
110  Clear EIV_Buffer   /*a 255 entry array of two-bit error information values */
120  if ErrDesc.valid = TRUE, then
130      startrow := ErrDesc.row
140      startcol := ErrDesc.col
150      endrow := (ErrDesc.row + ErrDesc.len) .mod. MaxRow
160      endcol := ErrDesc.col + ((ErrDesc.row + ErrDesc.len) / MaxRow)
170      NumCols := (endcol – startcol)
180      temp_startrow := startrow
190      Loop until i > NumCols
200          if (i < NumCols), then                                              /* still more columns to process after this one ? */
210              temp_endrow := MaxRow
220          else                                                                /* now processing last spanned column              */
230              temp_endrow := endrow   {endif 200}
240          if (CurrentRow >= temp_startrow) .and. (CurrentRow <= temp_endrow), then
250              EIV_Buffer[startcol + i] := ErrDesc.eiv   {endif 240}           /* store EIV in EIV buffer */
260          temp_startrow := 0                                                  /* set startrow to top of next column */
270          i := i+1 {endloop 190} {endif 120}                                  /* advance loop index */
```

PIPELINED ERROR DETERMINATION IN AN ERROR-CORRECTING COMMUNICATION SYSTEM

CROSS-REFERENCE TO RELATED APPLICATIONS

This application is a division of U.S. patent application Ser. No. 11/437,282 (filed May 18, 2006 now U.S. Pat. No. 7,610, 544 and entitled "Erasure Generation in a Forward-Error-Correcting Communication System") which claims priority from U.S. Provisional Application No. 60/682,196 (filed May 18, 2005 and entitled "Method and Apparatus for Erasure Generation in a MPE-FEC Decoder") and from U.S. Provisional Application No. 60/682,195 (filed May 18, 2005 and entitled "Method and Apparatus for Post MPE-FEC Error Detection"). U.S. patent application Ser. No. 11/437,282 and U.S. Provisional Application Nos. 60/682,196 and 60/682, 195 are hereby incorporated by reference.

TECHNICAL FIELD

The present invention relates to the field of data transmission and reception in a communication system and is particularly suitable for, but not limited to, digital video broadcasting to mobile terminals.

BACKGROUND

As shown in the digital video broadcast (DVB) system 100 of FIG. 1, a DVB transmitter 101 typically includes a video encoder 115 to encode video source information into a sequence of datagrams, an MPE-FEC (multi-protocol encapsulation with forward error correction) encoder 117 to generate a corresponding sequence of transport stream (TS) packets, a channel encoder 119 to encode channel error correction information, a modulator 121 to generate a modulated signal by impressing the information received from the channel encoder onto a carrier, an radio-frequency (RF) up-converter 123 to up-convert the modulated carrier to broadcast carrier frequency, and an antenna 125 to radiate radio-wave energy that corresponds to the transmitter output. As shown, the radio-wave energy is received at the antenna 131 of a counterpart DVB receiver 103 that includes, together with the antenna, a tuner 133 for selecting and down-converting a radio frequency channel of interest, a demodulator 135 for demodulating the signals received via the selected channel, an MPE-FEC decoder 139 for correcting errors at the link-layer, and an application processor 141 for performing source decoding to recover video and audio signals that are output to a display 143 and a speaker 145, respectively.

FIG. 2 illustrates a typical encoding operation performed by the transmit-side MPE-FEC encoder 117 of FIG. 1 to encapsulate internet-protocol (IP) datagrams 150, each having a header field and payload field, into one or more packets referred to as MPE sections 160. As shown, each MPE section 160, which includes header, payload and cyclic-redundancy-check (CRC, calculated from the MPE section header and payload) fields, is encapsulated into one or more transport stream (TS) packets 170, each having a header field and payload field, that are provided to the downstream transmitter stages for transmission via terrestrial DVB networks.

The DVB receiver 103 de-encapsulates contents of the received packets on the reception side, following exactly the reverse order in which the packet content is encapsulated. As shown in FIG. 1, the channel decoder 137 outputs channel-decoded transport stream (TS) packets to the MPE-FEC decoder, where IP datagrams are de-encapsulated by skipping the header and CRC of the MPE sections.

De-encapsulated IP datagrams are put into an MPE table 180, as shown in FIG. 3. The MPE table is a matrix with 255 columns and a programmable number of rows. IP datagrams are stored in the MPE table in a column-wise manner. That is, the first IP datagram is inserted into the first column of the table, starting with the first byte of the first datagram in the upper left corner of the matrix and going downwards to the first column. When the first column is full before the datagram ends, the datagram is continued at the top of the adjacent column.

In a typical implementation, the MPE table 180 is conceptually divided into two parts: an application data table 181 and a Reed-Solomon (RS) data table 183. The application data table 181 consists of the first 191 columns, and the RS data table 183 consists of the remaining 64 columns. IP datagrams, carried in MPE sections, are inserted into the application table 181 while RS data, carried in MPE-FEC sections, are inserted into the RS data table 183. When no sufficient IP datagrams and RS data are received, padding bytes and punctured RS data are inserted into the remaining space of the application data table 181 and RS data table 183, respectively.

Ideally, after forward error correction at the channel decoder and MPE-FEC decoder of a DVB receiver, the resulting datagrams delivered to the application processor should be error free. In practice, however, this is only true when the reception quality is sufficient to limit the number of errors in incoming packets to a tolerable threshold. Because modern DVB receivers are increasingly implemented in small, mobile devices, that have only a single small-form-factor antenna and that may be moving at a fast speed, sufficient signal reception quality cannot always be guaranteed. When signal quality suffers (e.g., due to fading, Doppler-effect, and impulsive noises) some datagrams may still contain errors, even after the error correction stages.

Referring to FIG. 1, to assist the application processor 141 of the DVB receiver 103 in performing error concealment and to avoid display disruption, a RS decoder is typically provided within the MPE-FEC decoder 139 to detect and correct errors within the contents of individual rows of the MPE table, referred to as codewords, and then indicate to the application processor whether the forwarded datagrams still contain errors after error correction. If a codeword has more errors than the RS decoder can correct, the RS decoder is generally unable to identify the specific byte or bit locations in error and instead indicates only that the codeword is corrupted.

In a typical implementation, the RS decoder is able to correct up to N/2 corrupted bits per codeword, where N is the number of parity bytes in the codeword. When provided with information that indicates the reliability/non-reliability of individual bytes of the codeword, referred to herein as erasure information, the number of corrupted bits corrected by the RS decoder may be doubled, from N/2 to N. More specifically, in the MPE-FEC decoder 139 of FIG. 1, incoming transport packets are recovered by a base-band processor that performs demodulation and channel decoding operations and thus is able to provide reliability information for each byte loaded into the MPE table. The reliability information is provided, along with the de-encapsulated datagram bytes, to the MPE-FEC decoder 139, which may then generate erasure bits that correspond to the individual datagram bytes.

Due to the virtual interleaving of the MPE table contents (i.e., column-wise data storage and row-wise RS decoding), erasure information obtained from the base-band processor is typically stored for a completely loaded MPE table before RS decoding is commenced. Recalling that the MPE table can store up to 255*1024 bytes of codeword, if one bit is used to represent the erasure information for each byte of an MPE frame, a 255K-bit erasure memory 190 is needed to store erasure information for the complete MPE frame as shown in FIG. 3. As the MPE frame memory in many cases consumes a substantial portion of the total die area of an integrated-circuit (IC) DVB receiver, the need to store an additional bit per byte of MPE frame memory represents a significant additional die area penalty and corresponding increase in device cost.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a digital video broadcast receiver having a memory-efficient MPE-FEC decoder according to one embodiment;

FIG. 5 illustrates an exemplary operation of the digital video broadcast receiver of FIG. 4, and illustrates an example of an error descriptor format that may be used to record error information within an error information table with reduced memory requirement;

FIG. 6 illustrates an exemplary pipelined operation of an erasure generator and error correcting circuit within the digital video broadcast receiver of FIG. 4;

FIG. 8 is a pseudocode listing of exemplary operations that may be performed by a transport packet processor to derive and store error descriptor information within an error information table, and to de-encapsulate and store datagrams within an MPE frame memory;

FIG. 10 is a pseudo-code listing of operation within each descriptor processing unit within the erasure generator of FIG. 9 according to one embodiment.

DETAILED DESCRIPTION

Figure 1:
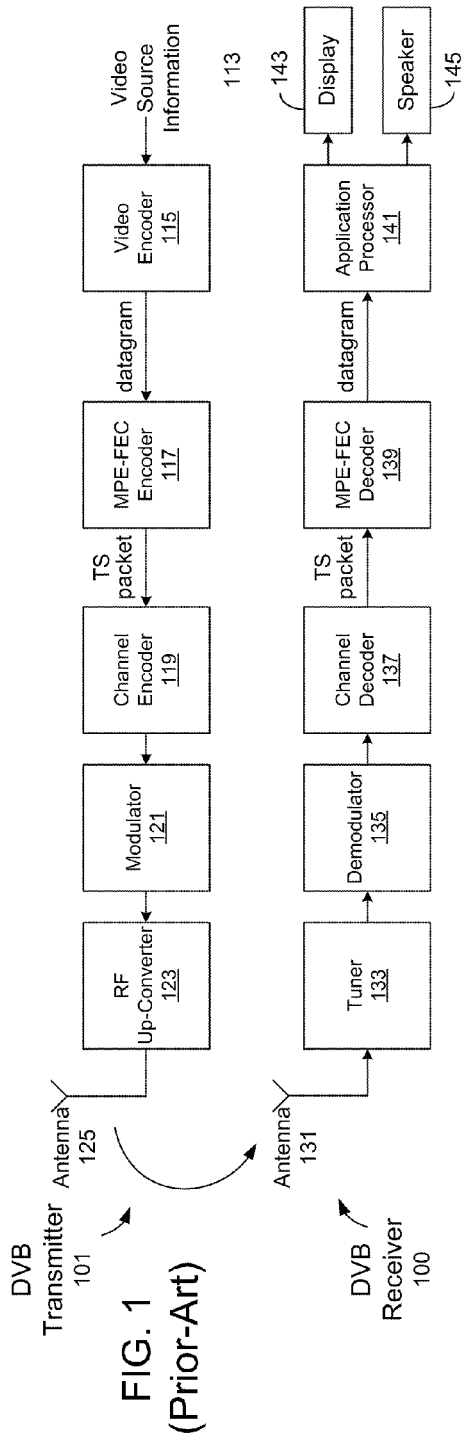
FIG. 1 illustrates a prior-art digital video broadcast transmitter and receiver.
Figure 2:
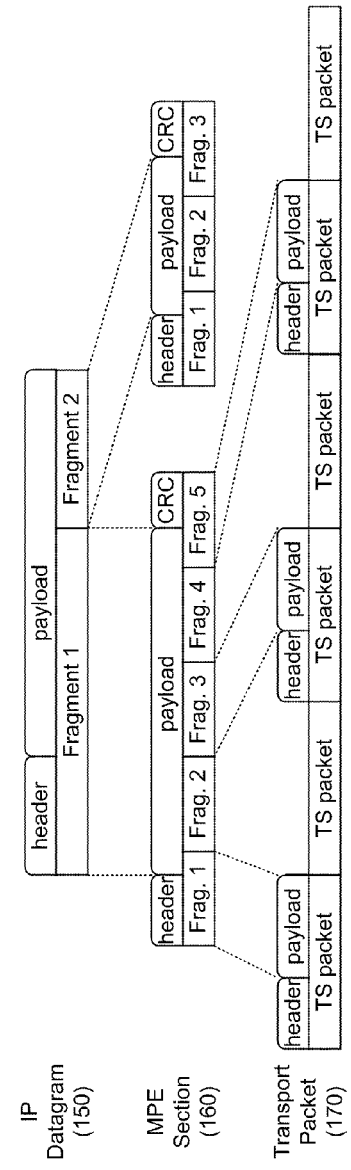
FIG. 2 illustrates a typical encoding operation performed by the transmit-side multi-protocol-encapsulation, forward-error-correction (MPE-FEC) encoder of FIG. 1.

A forward-error-correcting communication system having significantly reduced error memory requirement is disclosed in various embodiments. In one embodiment, a digital video broadcast (DVB) receiver, implemented in one or more integrated circuit die, includes a multi-protocol-encapsulation, forward-error-correcting (MPE-FEC) decoder that records error information in a compressed format and thus consumes only a fraction of the memory otherwise required to store an erasure bit per byte. In a particular embodiment, the compressed format includes a set of error data elements referred to herein as error descriptors that may individually indicate the reliability of multiple bytes within an MPE frame, and yet require less storage than if individual bits were stored to indicate the reliability of those same bytes. Additionally, circuitry is provided to decompress the error descriptors to recover an erasure bit per byte of a given RS codeword in a manner that permits row-by-row processing of each RS codeword within an RS decoder. By this operation, erasure bit generation and RS decoding may be pipelined to achieve relatively low-latency, low-power error correction.

FIG. 4 illustrates a DVB receiver 200 having a memory-efficient MPE-FEC decoder 205 according to one embodiment. As shown, a memory bus 210 couples and facilitates data exchange between various sub-blocks of the DVB receiver 200, including a bus arbiter 201 to provide arbitrated control over the memory bus by the other sub-blocks; a receiver/baseband processor 203 which performs physical-layer signal reception, demodulation and channel decoding operations to recover and output sequences of transport stream (TS) packets (e.g., receiving a radio-frequency digital video signal and recovering TS packets therefrom); a transport packet (TP) processor 209 to de-encapsulate datagrams and derive error information from sequences of transport packets received from the baseband processor; an MPE frame memory 207 which is loaded with datagrams and error correction data recovered by the TP processor 209; an erasure generator 211 including an error information table 212 (EIT) which is loaded with error information derived by the TP processor 209, and circuitry to process the error information to generate strings of erasure bits, referred to herein as erasure bit vectors, that correspond to respective codewords stored within the MPE Frame memory 207; and an error-correcting decoder 213 to perform row-by-row decoding (i.e., error correction) of codewords retrieved from the MPE frame memory 207 using corresponding erasure bit vectors received from the erasure generator 211. In the embodiment of FIG. 4 and other embodiments described herein, the error-correcting decoder is shown and described as being a Reed-Solomon (RS) decoder, though other erasure-assisted decoders may be used in alternative embodiments.

Figure 3:
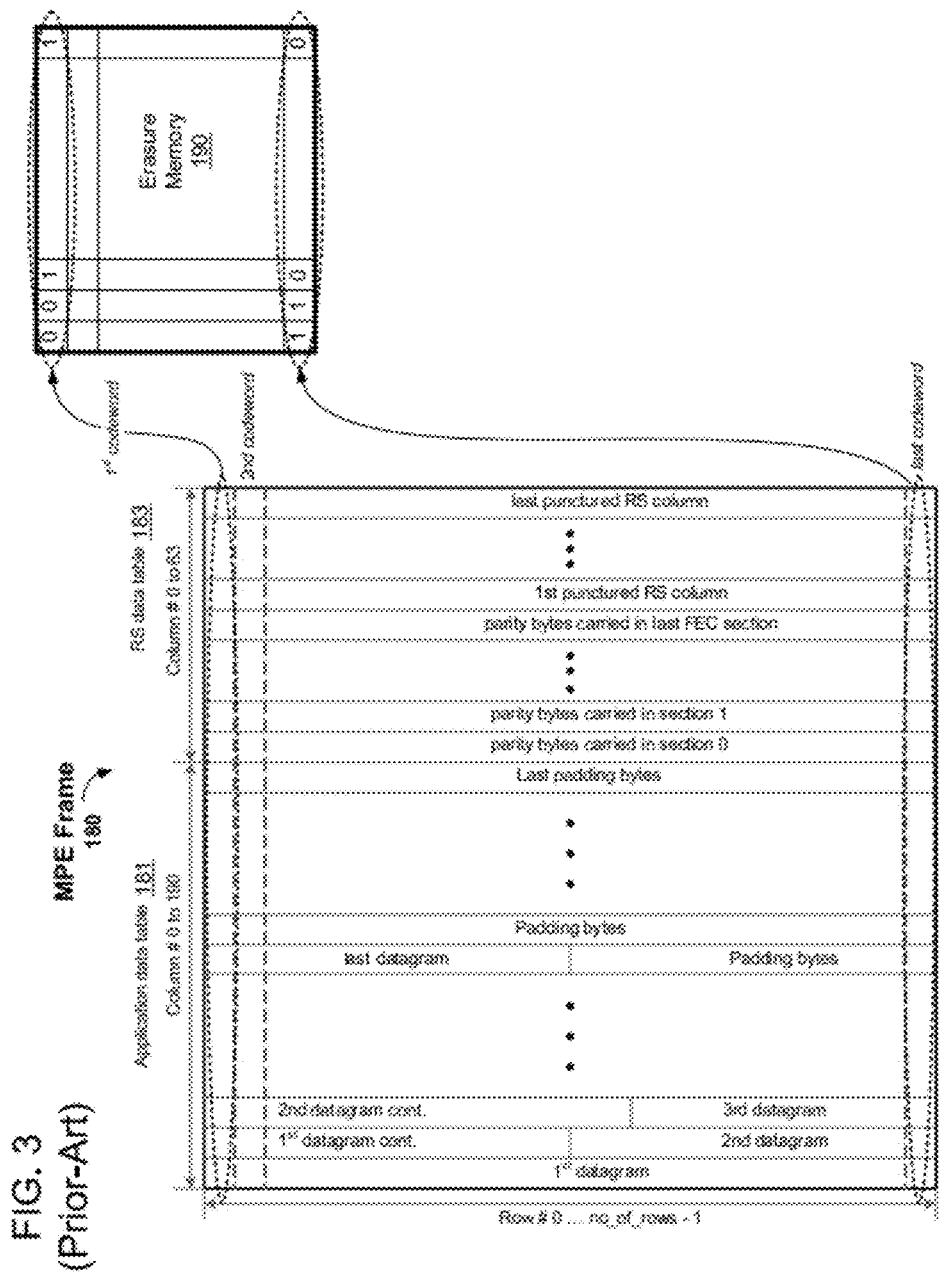
FIG. 3 illustrates an organization of de-encapsulated datagrams within a multi-protocol-encapsulation (MPE) table.

FIG. 5 illustrates an exemplary operation of the DVB receiver 200 of FIG. 4, and illustrates an example of an error descriptor format that may be used to record error information within the error information table 212 with reduced memory requirement relative to the bit-per-MPE-frame-byte embodiment described in reference to FIG. 3. Starting at 250, the baseband processor 203 receives a transport packet (i.e., performs signal reception, demodulation, channel decoding operations to recover a transport stream (TS) packet, referred to herein for brevity as a transport packet) and forwards the packet to the TP processor 209, for example, via the memory bus 210 (although another shared or dedicated signaling path, not shown in FIG. 4, may be alternatively used to convey transport packets to the TP processor). At 252, the TP processor 209 parses the transport packet header and encapsulated MPE section to (1) derive error information and store the error information in compressed form (e.g., as error descriptors shown by example at 280 of FIG. 5 and discussed in further detail below) within the error information table 212 as shown at 253a, and (2) de-encapsulate datagrams (e.g., internet-protocol (IP) datagrams) and store the datagrams in the MPE frame memory 207 as shown at 253b. The baseband processor 203 and TP processor 209 continue to perform the operations shown at 250 and 252 until the MPE frame memory 207 has been fully loaded with datagrams and corresponding error correction data (which may include padding bytes and punctured error correction bytes), at which time the MPE frame is deemed to be complete in decision block 254. When the MPE frame is complete, the erasure generator 211 and RS decoder 213 are enabled to perform pipelined, erasure-assisted RS decoding on each row of the MPE frame table, one row at a time (though the granularity of RS decoding operations may include processing multiple rows of the MPE frame table concurrently in alternative embodiments). In a particular implementation, the pipelined RS decoding includes generating erasure bit vectors for each row of the MPE frame table one after another, and applying the erasure bit vector for each row of the MPE frame table in an RS decoding operation in that row concurrently with generation of the erasure bit vector for the subsequent row. Such pipelined operation is shown, for example, in FIG. 6.

In one embodiment, the TP processor 209 of FIG. 4 derives error information from the following fields of the transport packets and encapsulated MPE sections and MPE-FEC sections:

The transmit error indicator (TEI) bit within the transport packet. The base-band processor sets this bit if the error correction decoder of the base-band processor fails to correct all errors in the transport packet;

The continuity counter field within transport packet which, absent loss of a transport packet or corruption of the continuity count within the continuity counter field, is incremented by one (with modulo overflow) in each successive transport packet; and The cyclic redundancy check (CRC) field within an encapsulated MPE section or MPE-FEC section. The TP processor re-calculates the CRC for the MPE section or MPE-FEC section and compares the re-calculated CRC with the received CRC.

In a specific embodiment, depicted for example by an EIV field 281 within the error descriptor 280 of FIG. 5, the error information is coded into a two-bit error information value (EIV) which represent the following three cases:

"00": no error. The TP processor marks the error status of an entire IP datagram as "00" when (1) TEI is reset and the continuity count value is correct for all constituent transport packets, and (2) the received CRC matches the re-calculated CRC for all constituent MPE sections.

"11", hard error. The TP processor marks the error status of an entire IP datagram as '11' if (1) either a CRC failure is detected within a constituent MPE section or a TEI bit is set within a constituent transport packet, and (2) an incorrect continuity count (i.e., non-continuous count value) is detected within a constituent transport packet; and the continuity counter does not match the expected value, implying that one or more transport packets have not been received or have been received out of order.

"01", soft error. The TP processor marks the error status of an entire IP datagram as '01' if either a CRC failure is detected within a constituent MPE section or a TEI bit is set within a constituent transport packet, but no continuity errors are detected (i.e., the continuity count value is correct for all constituent transport packets).

In one embodiment, discussed in further detail below, an error information value that corresponds to one or more IP datagrams determined to have a hard or soft error is recorded within the error information table along with address-sequence information that indicates a contiguous sequence of bytes or run-length within the MPE frame memory to which the error information value corresponds. During RS decoding, the error information values and address-sequence information are used to generate erasure bit vectors that are provided to the RS decoder 213 to increase the quantity of corrupted bits that may be corrected by the RS decoder 213 and, optionally, to enable RS decoding operation to be bypassed for those codewords determined to have no errors or to have fixed or programmable numbers of hard and/or soft errors.

As discussed above, the MPE frame table (i.e., datagrams and error correction information) is stored in the MPE frame memory 207. In a particular embodiment, to enable storage of datagrams in a column-wise manner and to enable RS decoding to be performed in a row-wise manner, the MPE frame memory 207 includes a row-access port and column-access port to allow both row-wise and column-wise read/write access. By this arrangement, datagrams and error correction information may be loaded into (i.e., written to) the MPE frame memory 207 in a column-wise manner as part of transport packet processing and codewords may be read from the MPE frame memory 207 in a row-wise manner during RS decoding and, after error correction, written back to the MPE frame memory 207 in row-wise manner.

In a 255-column by 1024-row MPE frame memory (note that the number of rows may be programmably specified and/or the number of rows or columns may be different in alternative embodiments), 255×1024=255K bytes of datagram and error correction data may be stored. Accordingly, if one bit is used as an erasure for each byte of the MPE frame, then 255×1024=255K bits of memory or registers may be needed in total to store the erasure information. If two bits are used as an erasure per byte, for example to enable indication of soft errors, 510K bits of memory or registers may be needed in total to store the erasure information.

In one embodiment, a more efficient representation of erasure information enables use of a much smaller memory to store the erasure information for the MPE-FEC decoder 205. In particular, in an embodiment in which error information is derived from headers of transport packets and CRCs of encapsulated MPE sections (and MPE-FEC sections), it follows that such error information qualifies all bytes within the corresponding transport packet payloads and MPE section payloads. Further, to the extent that an error applies to the payload of a transport packet or encapsulated MPE section, the error also applies to the datagram encapsulated within the transport packet or MPE section (or the error correction data (e.g., RS parity data) encapsulated within the transport packet or MPE-FEC section) and thus may be deemed to apply to (i.e., indicate as having a hard or soft error) all the bytes of the datagram wholly or partially constituted by the transport packet payload or MPE section payload. In one embodiment, this datagram-based error granularity is exploited as shown at 280 of FIG. 5, by recording error information in an error descriptor to store (1) a single error information value (EIV) for each set of one or more column-contiguous datagrams marked by a soft or hard error (field 281), (2) the starting row number (RNS, field 287) and starting column number (CNS, field 285) within the MPE frame memory of the first datagram in the set of datagrams, and the length (i.e., number of contiguous bytes or run-length), extending down the column and over to an adjacent column or columns if necessary, of the segment of MPE frame memory to which the error information value applies (LEN, field 283). In a particular embodiment, the length field 283 of an error descriptor specifies the number of bytes encompassed, inclusively, between the starting row/column of a first datagram and the ending row/column of the final datagram in a sequence of same-error datagrams. To avoid overflowing the length field 283, the total number of bytes to which a given error descriptor applies may be fixed. Also, the error descriptor may include a validity field 289 (V) to store a bit that indicates whether the error descriptor is valid or invalid (i.e., used or unused).

In one embodiment, each error descriptor is stored within a respective 32-bit (four-byte) segment of the error information table 212 of FIG. 4 as follows:

TABLE 1

| Bits | Field name | Description |
|---|---|---|
| 31 | Valid | 1: Error descriptor Valid<br>0: Error descriptor Invalid |
| 30:21 | RNS | Row number of the starting byte. Range: 0~1023. |
| 20:13 | CNS | Column number of the starting byte. Range: 0~255. |
| 12:2 | LEN | Run length of the error info. Range: 0~2047. |
| 1:0 | EIV | Error information value which can have the following values:<br>00: no error. For example, this EIV value applies to all padding data in the application data table.<br>11: hard error. For example, this EIV value applies to all punctured data in the RS data table.<br>01: soft error;<br>10: reserved. |

Note that other encoding formats and field widths may be used in alternative embodiments. For example, the number of bits in the starting row and column numbers may vary with the logical and/or physical dimension of the MPE frame memory 207, the run length may include more or fewer bits and so forth. Further, rather than recording error information on datagram or datagram-sequence basis, error information may be recorded on a transport packet basis or MPE section basis, thus providing different granularity of the error information relative to the MPE frame table.

In one embodiment, the size of the error information table 212 (also referred to herein as an error memory) is further limited by assuming a minimum datagram size and limiting the total number of error descriptors (i.e., descriptors that indicate a hard error or soft error in a run of one or more datagrams) to some threshold fraction of the total number of datagrams (or same-error datagram sequences) that may be loaded into the MPE frame table. For example, in a particular implementation, a minimum datagram size of 64 bytes is assumed, and the maximum number of error descriptors that may be stored corresponds to approximately 25% of the total number of 64-byte datagrams that may be stored within the MPE frame memory. Note that providing error descriptor storage for only a fraction of the total number of datagrams that may be stored in the MPE frame memory may result from a hardwired or programmable policy value that controls whether or not to perform RS decoding and/or other MPE frame processing (e.g., not to render video information conveyed in the MPE frame) if the error density exceeds the selected fraction. Note that while the error descriptor storage capacity (i.e., error information table size) sets an upper bound for the fraction of the total number of datagrams (and/or datagram sequences) that may be indicated to be in error, a lesser fractional value may be programmed within a configuration register or configuration circuit of the host integrated circuit to establish a cut-off for RS decoding and/or other MPE frame processing.

As an example of the foregoing, in an embodiment having a 255-column by 1024-row MPE frame memory, up to 4080 64-byte datagrams may be stored per MPE frame, so that an error information table capable of storing 4080/4=1020 error descriptors is provided. Consequently, in an implementation that stores error descriptors in the four-byte format shown above in Table 1, a 4080-byte (32K bit) error information table 212 is provided to store error descriptors for each MPE frame; a mere fraction of the 255K bit storage needed to store an error bit per byte of an MPE frame, and an even smaller fraction of the 510K bit storage needed to store a two-bit error value per byte of an MPE frame.

Figure 7:
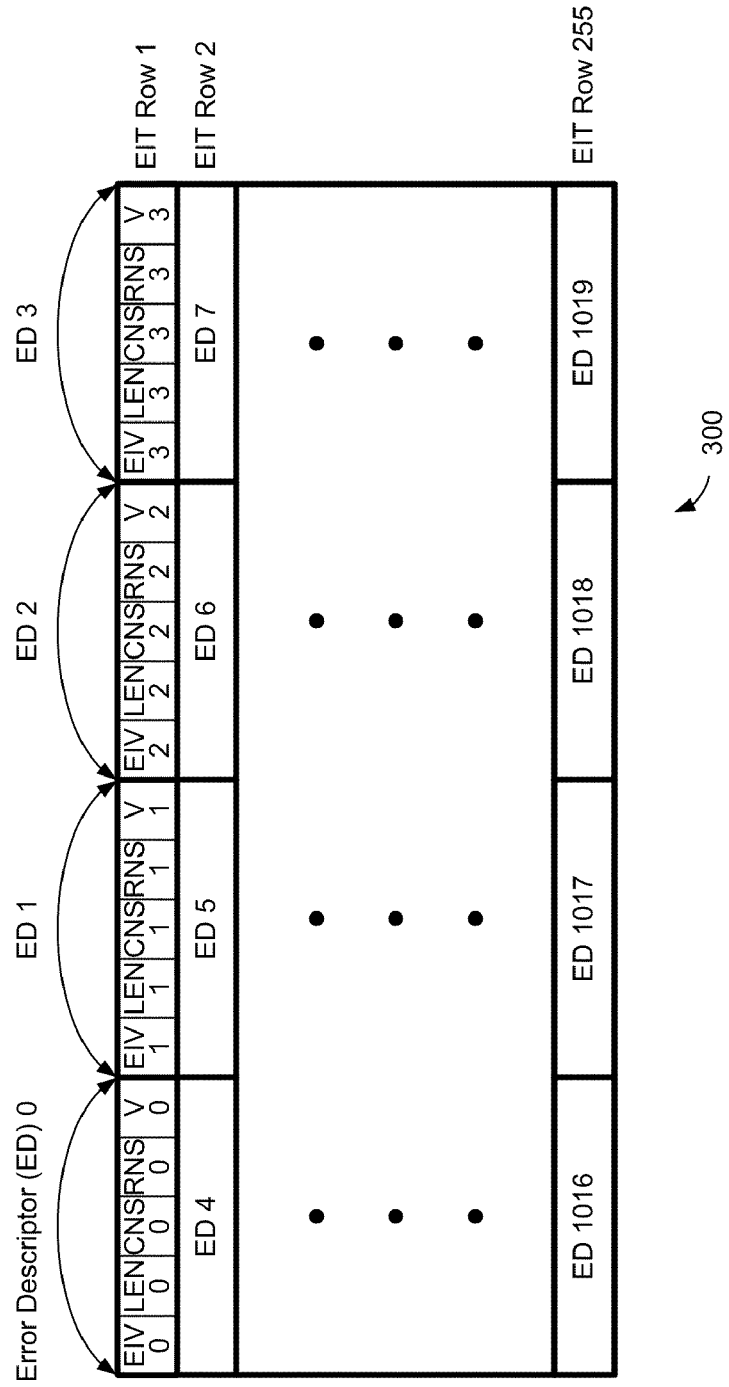
FIG. 7 illustrates an exemplary embodiment of an error information table that may be included within the digital video broadcast receiver of FIG. 4.

In one implementation, the RS decoder of FIG. 5 has a throughput of one byte of a codeword per processing cycle so that, for a 255-byte codeword, 255 processing cycles are applied to generate erasures for the entire codeword. Accordingly, in one embodiment, a 1020-descriptor error information table 212 is organized into 255 rows of four descriptor entries each (each row thus containing 16 bytes of storage) each, with each successive row being read out and processed in a respective processing cycle to generate an erasure bit vector for the row of the MPE frame memory next to be processed by the RS decoder 213. By this arrangement, the error descriptor processing time (i.e., time required to generate an erasure bit vector for a given row of the MPE frame memory) may be matched to the RS decoder processing time for each row of an MPE frame, thus enabling the pipelined operation illustrated in FIG. 6. Note that, because the error information table 212 is not always fully filled, a register may be provided within the erasure generator 211 (or elsewhere) to point to the last valid error descriptor. Alternatively (or additionally), validity fields may be included within the error descriptor entries as shown by field 289 in FIG. 5 (and in Table 1), with cleared validity fields indicating non-used error descriptor entries. An exemplary embodiment of an error information table 300 organized in accordance with the foregoing example and the error descriptor format of Table 1 is shown in FIG. 7.

FIG. 8 is a pseudocode listing of exemplary operations that may be performed by a TP processor to derive and store error descriptor information within an error information table, and to de-encapsulate and store datagrams within an MPE frame memory as shown in blocks 253a and 253b, respectively, of FIG. 5. Within the listing and any other pseudocode listing herein, line numbers are generally provided for individual pseudocode statements, the symbol ':=' denotes assignment (as opposed to an equality test), a 'b' following a sequence of '1' and/or '0' values denotes binary notation, text bounded by '/*' and '*/' constitute comments, and terminations of 'If' statements and loop constructs are marked by {endif ###} and {endloop ###}, respectively, with the numeric value '###' corresponding to the line number at which the 'If' statement or loop construct begins. Also, the pseudocode listings herein should not be construed as requiring a programmed processor to perform the specified operations (hardwired circuitry alone (e.g., synthesized logic) or in combination with a programmed general-purpose or special-purpose processor may be used to complete the operations). The pseudocode listings should not be construed as requiring a particular programming language be used to express the specified operations.

Starting at line 100, temporary variables, "ed" and "tE," which represent, respectively, an error descriptor index (e.g., address within the error information table 212 of FIG. 4 or within the error information table 300 of FIG. 7) and an error state value for a datagram to be de-encapsulated, are both initialized to zero. At line 110, row and column indices (i.e., address values) are initialized to point to the start of MPE frame memory. At line 120, validity bits are reset in the error descriptor memory and temporary buffers (MPE section buffer and Datagram buffer) in preparation for storing MPE sections and datagrams under construction (i.e., being de-encapsulated). Note that validity bits may be omitted in an embodiment having a register to point to the final valid error descriptor entry in the error information table and, in such an embodiment, the pointer register may be reset at line 120 to point to the first error descriptor entry (e.g., entry '0').

At line 130, the TP processor begins a loop that is continued until the MPE frame memory has been loaded with a complete MPE frame. At line 140, the TP processor receives (or retrieves) the next transport packet from the baseband processor, and then at lines 150-153, sets the error state value to indicate a hard error ('11') if a puncture bit is set in the transport packet header. If the puncture bit is reset and the transport-error-indicator (TEI) bit is set in the transport packet header, the error state value is logically ORed (indicated by '.or.') with '01b' to indicate a possible soft error. At line 160, the continuity count value within the transport packet is compared, at least in packets following the first transport packet for an MPE frame, with the continuity count value for the immediately preceding transport packet to determine whether a continuity error has occurred (e.g., packet missed or received out of order). If a continuity count error has occurred, the error state value is logically ORed with '10b', thereby recording a hard error state if the error state value had previously been assigned the soft error value '01b.' As discussed below, if a continuity count error has occurred, but no TEI error or CRC is detected (i.e., leaving the error state value in reserved state '10b'), the error state value may be reset to indicate no error as discussed above in reference to an exemplary soft/hard error indication policy. Alternatively, the '10b' error state may be used as an additional level of soft error indication.

At line 170, the transport packet payload is added to the MPE section (or MPE-FEC section) under construction (i.e., appended to contents, if any, within the MPE section buffer). If the MPE section is complete (evaluated at line 180), the CRC value for the MPE section is re-generated and compared with the received (now de-encapsulated) CRC value at line 190 to determine if a CRC error has occurred. If a CRC error is detected, the error state value is logically ORed with '01b' at line 200 to indicate the soft error or, if already in a '10b' state, to indicate a hard error.

At line 210, the MPE section payload is added to the datagram (or MPE-FEC section payload added to RS data value) under construction (i.e., appended to contents, if any, within the datagram buffer, and at line 220 the MPE section buffer is cleared for construction of the next de-encapsulated MPE section (or MPE-FEC section). If the current datagram (i.e., datagram under construction) is determined to be complete at line 230, then the error state value is reset to '00b' at line 237 if equal to the reserved error state '10b' (determined in the If statement at line 235). As discussed above, this operation may be omitted if the '10b' error state value is to be used as an error indicator. At line 240, the completed datagram (or RS data value) is loaded into the MPE frame memory starting at the row and column indicated by indices, row and col.

At line 250, the validity field for the error descriptor entry specified by the current error descriptor index, ed (i.e., ErrDesc[ed].valid) is evaluated to determine whether the error descriptor index points to an already valid error descriptor. If the error descriptor index does not point to a valid error descriptor, then processing skips to line 370 where the error state value is evaluated to determine whether a soft error or hard error has been detected for the newly constructed datagram. If so (i.e., if tE is not equal to '00b'), then the error descriptor at the error descriptor index is marked as valid at line 380, the error state value is recorded within the error information value (EIV) at line 390, the number of bytes to which the error information value applies (i.e., run-length of the error descriptor) is recorded as the datagram length (which, though not specifically shown in FIG. 7, may be accumulated during datagram construction) at line 400, and the starting row and column number of the byte sequence to which the error descriptor applies is recorded at lines 410 and 420, respectively.

Returning to line 250, if the error descriptor index does point to a valid error descriptor, then the error descriptor is deemed to be complete (i.e., run-length not to be extended) if the error state value indicates either (1) that no error is detected for the newly constructed datagram, (2) that the detected error state is different than the error state recorded in the current error descriptor (e.g., hard error previously recorded, soft error currently detected or vice-versa), or (3) that the detected error state matches the recorded error state, but that the run-length value for the error descriptor will overflow if increased by the length of the current datagram). If no error has been detected (determined at line 260), the error descriptor index is incremented at line 270 to point to a subsequent and as-yet-invalid error descriptor entry. The second and third cases are handled by the 'else' statement at line 300 (which is reached following a negative result from a logical AND at line 280 of a comparison of the recorded and detected error states and a determination of whether adding the datagram length to the run-length field of the error descriptor will exceed MaxLength and thus overflow the run-length field), and in which the error descriptor index is incremented to point to a new error descriptor entry, and the validity, error information field, run-length field, row and column are assigned at lines 320-360 in the same manner as described in reference to lines 380-420.

Still referring to the 'If, else-if, else' statement spanned by lines 260-360, if the error state value indicates that a detected error matches the error recorded within the current error descriptor, and that the run-length field of the error descriptor will not overflow upon addition of the datagram length, then the error descriptor is updated by adding the datagram length to the current run-length value.

After the completed datagram has been loaded into the MPE frame memory and the error state information processed (i.e., generally as shown at lines 235-420), the row index is updated at line 430 to be the current row index plus the datagram length, modulus the number of rows (i.e., MaxRows as determined by frame memory capacity or set by a programmable value) of the MPE frame memory that are used for MPE table storage, and the column index is updated at line 440 to be the current column index plus the number of MPE frame memory columns spanned by the newly loaded datagram (i.e., determined by an integer division of the sum of the current row and datagram length by MaxRows). At line 450, the datagram buffer is cleared or otherwise reset to prepare for construction of the next datagram, thus concluding the if statements at lines 230 and 180, and returning to the top of the loop at line 130 to de-encapsulate the next IP datagram and record the corresponding error information, if any.

Figure 9:
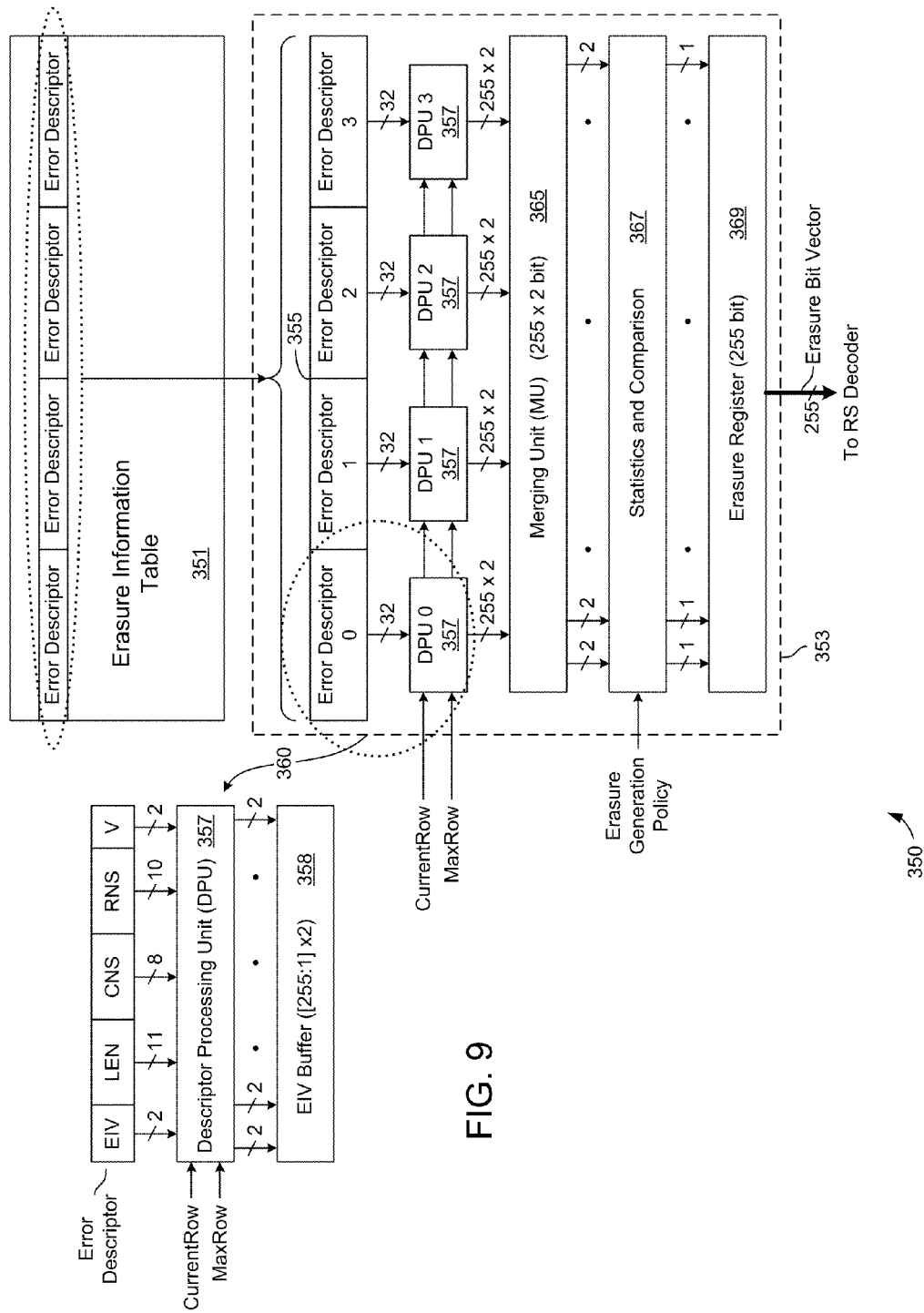
FIG. 9 illustrates an embodiment of an erasure generator that may be used to implement the erasure generator shown in FIG. 5.

FIG. 9 illustrates an embodiment of an erasure generator 350 that may be used to implement the erasure generator 211 of FIG. 5. As shown, the erasure generator 350 includes an error information table 351 to store error descriptors as described above and an erasure processor 353 to process contents of the error information table one row at a time to generate respective erasure bit vectors for application within the RS decoder. Following the exemplary embodiment of FIG. 7, a row of four error descriptors are output from a successively incremented row of the error information table 351 in each erasure processing cycle and buffered in an error descriptor buffer 355 within the erasure processor 353. Note that different numbers of error descriptors may be read out of the error information table 351 (e.g., the error information table 351 may be wider or narrower) in alternative embodiments, and the error descriptor buffer 355 may be omitted and the error descriptors supplied directly from the selected row of the error information table 351 to downstream logic within erasure processor 353.

During a given erasure processing cycle, the error descriptors within the error descriptor buffer 355 (or supplied directly from the error information table 351) constitute an erasure information source and are supplied to respective descriptor processing units (DPUs) 357. Referring to detail view 360, each DPU 357 receives a respective 32-bit error descriptor having, for example, a constituent 2-bit error information value, 11-bit run-length value, 8-bit starting column number, 10-bit starting row number and 1-bit validity indicator generally as described above in reference to FIG. 5 and Table 1. As discussed, the error descriptor encoding format and specific numbers of bits may be different in alternative embodiments. The DPU 357 additionally receives the row address, CurrentRow, of the MPE frame memory for which erasure information is currently being generated, and a value, MaxRow, that indicates the total number of rows to be processed in each pass through the error information table (i.e., in effect, the logical depth or used portion of the MPE frame memory, even if the MPE frame memory includes a physically larger number of rows).

Each of the DPUs 357 operates in parallel (i.e., concurrently) to process a respective one of the error descriptors within descriptor buffer 355 in a given erasure processing cycle and to generate a corresponding 255×2-bit (i.e., 510-bit) erasure information vector that indicates, for each byte within the MPE frame memory at the CurrentRow, whether the byte contains a soft error or hard error. As shown, the erasure information vector may be stored in a buffer, referred to herein as an EIV buffer (which may be provided at an output interface of the DPU or in the input interface of downstream logic), though the buffer may be omitted in alternative embodiments, and the erasure information vector output directly from logic within the DPU 357 to downstream logic within the erasure processor 353.

FIG. 10 is a pseudo-code listing of operation within each DPU 357 of the erasure generator 350 of FIG. 9 according to one embodiment. At line 100, a loop index 'i' is initialized to zero and at line 110 the contents of the corresponding EIV buffer are cleared to zero, thus establishing an initial no-error state for each of the 255 EIV buffer entries. At line 120, the validity field of the current error descriptor, ErrDesc.valid, is evaluated to determine whether a valid error descriptor has been received. If not, no further processing is performed on the current error descriptor so that all two-bit error information values in the EIV buffer remain in the no-error state. If the current error descriptor is valid, then variables startrow, startcol, endrow and endcol are assigned values that represent the row/column locations of starting and ending bytes of a continuous column-wise sequence of bytes within the MPE frame memory to which the error descriptor applies. More specifically, at lines 130 and 140, startrow and startcol are assigned the values of the start row number (ErrDesc.row) and start column number (ErrDesc.col) from the current error descriptor, respectively, and at line 150, endrow is assigned to be the startrow (i.e., ErrDesc.row) plus the run-length (ErrDesc.len) modulus (i.e., remainder of integer division) the MaxRow value (i.e., logical number of rows in the MPE Frame memory). At line 160, endcol is assigned to be the startcol (i.e., ErrDesc.col) plus the integer quotient of the total number of rows spanned by the error descriptor (startrow+ run-length) divided by the number of rows per column, MaxRow. At line 170, a variable, NumCols, is assigned the value of endcol-startcol and thus represents the ordinal number of MPE frame columns spanned by the error descriptor less one. At line 180, a temp_startrow variable is initialized to the startrow value in preparation for processing the spanned columns.

At line 190, a column processing loop is commenced to process each of the spanned columns (i.e., loop until i>NumCols). Within the column processing loop, at line 200, if 'i' remains less than the number of spanned columns, then more columns remain to be processed after the presently indexed column (i.e., column offset indicated by present value of 'i', the loop variable). Accordingly, a temp_endrow value is assigned the MaxRow value at line 210, thus providing the ending point for testing to determine whether the sequence of bytes in error within the presently indexed column of the MPE frame memory cross the row of the MPE Frame table being processed (i.e., CurrentRow). If, the presently indexed column is the final spanned column (i.e., 'i' is not less than NumCols), then at lines 220 and 230, the temp_endrow value is assigned the endrow value determined in line 150.

At line 240, the CurrentRow value is compared with the temp_startrow and temp_endrow values. As shown, if CurrentRow is greater than or equal to temp_startrow and less than or equal to temp_endrow, then the MPE Frame memory row indicated by CurrentRow includes a byte that is indicated by the current error descriptor to have a soft or hard error and, accordingly, at line 250, the EIV buffer element for the column in question (i.e., the starting column, startcol, plus the present column offset, 'i') is assigned the error information value from the error descriptor (i.e., ErrDesc.eiv). At line 260, the temp_startrow is reset to zero (the address of the starting row of the next column) and at line 270, the loop index is incremented, concluding the loop begun at line 190. Upon testing the loop index again at 190, the loop operations are performed for the next column if the loop index remains less than or equal to NumCols or, if greater than NumCols, all the columns have been processed, concluding processing of the current error descriptor.

Returning to FIG. 9, the contents of the EIV buffers for DPUs 357 are provided to a merging unit 365 which consolidates the four erasure information vectors into a unified 255× 2-bit erasure information vector according to a hardwired or programmed merging policy. In one embodiment, for example, the contents of the erasure information vectors are logically ORed so that if a hard error ('11b') is output for a given index position within any one of the four input erasure information vectors, a hard error is recorded in that index position within the unified erasure information vector, regardless of the contents of the other input erasure information vectors at that index position. Through the same logic 'OR' operation, if none of the input erasure information vectors indicates a hard error at a given index position, but one or more of the erasure information vectors indicate a soft error ('01b'), a soft error is recorded in that index position within the unified erasure information vector. Other logical combinations of errors may be used to merge hard, soft and no-error indications within the unified erasure information vector in alternative embodiments.

The merging unit outputs the unified erasure information vector to a statistics and comparison logic circuit 367 which translates the input vector into a final erasure bit vector (i.e., 255×1-bit vector) that is buffered in erasure bit register 369 and provided to the RS decoder for application in an RS decode operation. In one embodiment, the statistics and comparison logic circuit 367 provides one or more signals to the RS decoder to indicate whether the number of hard errors within the corresponding codeword exceeds the number of errors correctable by the RS decoder, or whether no errors at all have been detected within the codeword. As discussed below, in either case, the RS decoding operation may be bypassed (i.e., skipped or not performed) to conserve power and potentially free up processing resources for other tasks. The statistics and comparison logic circuit 367 may also signal the RS decoder that RS decoding may be omitted if the soft error count exceeds a fixed or programmed threshold and/or if some combination of fixed or programmed hard and soft error thresholds have been exceeded. In a particular embodiment, for example, the statistics and comparison logic circuit 367 performs the following conversion from two-bit soft/hard error indication to single-bit erasure and generates control signals as follows:

Count the number of hard-error inputs ('11b').
Count the number of soft-error inputs ('01b').
If the hard-error count>64, the corresponding codeword is not (or may not be) correctable. Assert not_correctable control signal.
If hard-error count and soft-error count are both zero, no error has been detected. Assert no_correction control signal.
Convert all 2-bit erasures whose error information values are "11" into "1"
Convert all 2-bit erasures whose error information values are "00" into "0".
Convert soft errors into logic '1' erasure bits until the number of such conversions reaches (hard-error count minus soft-error count) and convert all remaining soft errors to logic '0' erasure bits.

Other conversion policies may be applied in alternative embodiments or when different conversion policies are programmed within a configuration register or circuit of the DVB receiver.

As discussed above, in one embodiment, the erasure generator and the RS decoder are configured and operated to permit pipelining the operations of erasure generation and RS decoding. More specifically, as shown in FIG. 6, when the RS decoder is decoding a given codeword, the erasure generator is generating the erasure bit vector for the next codeword to be decoded. As discussed, this is made possible within embodiments described herein by designing the erasure generator to generate each successive erasure bit vector in the same number of cycles (or fewer cycles with wait cycles upon completion) required for the RS decoder decode one codeword. At least one benefit of this pipelined arrangement is that in the following cases, RS decoding operation may be by-passed to save power and free up processing resources:

1. The number of erasures (i.e., logic '1' bits in the erasure bit vector) for a given codeword exceeds the maximum number of errors that can be corrected through RS decoding. In this case, there is no point in performing RS decoding operation.
2. There are no erasures. In this case, the RS decoder may optionally (or programmably) be enabled to perform or bypass the RS decoding operation.

Where RS decoding is bypassed (e.g., in either of the two cases above), power saving may be achieved, for example and without limitation, by disabling the toggling of the clock (i.e., gating off the clock) provided to the RS decoder, and by disabling MPE frame memory access within memory fetch circuitry of the RS decoder, thereby avoiding codeword fetch and storage of the codeword within the RS decoder.

Figure 11:
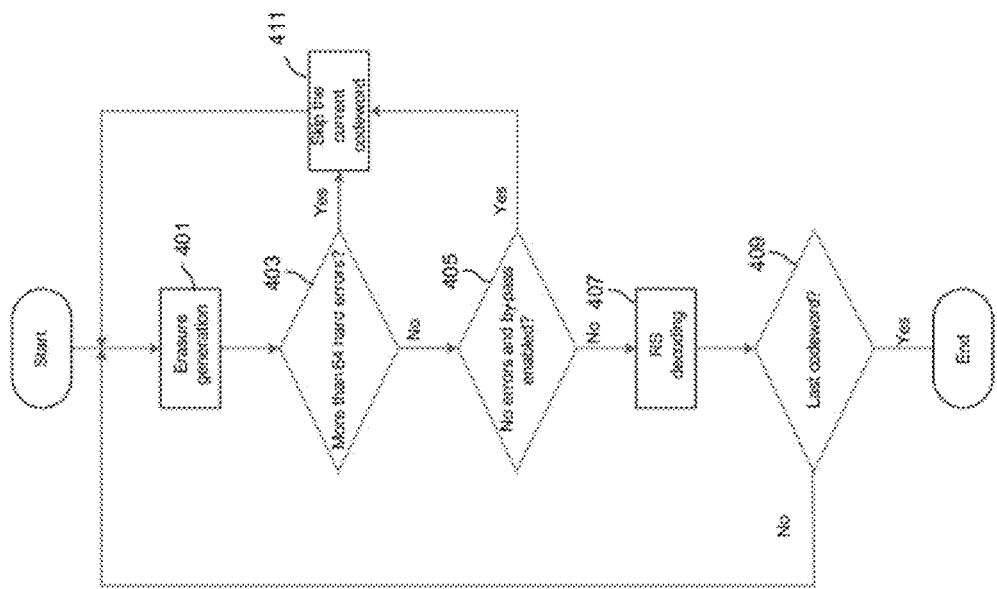
FIG. 11 is an exemplary flow diagram illustrating iterative erasure generation and conditional error correction (Reed-Solomon decoding in this example) on a codeword by codeword basis.

FIG. 11 is an exemplary flow diagram illustrating iterative erasure generation and conditional RS decoding on a codeword by codeword basis. At 401 an erasure bit vector is generated for the next codeword potentially to be decoded by the RS decoder. At decision block 403, the erasure bit vector is evaluated to determine whether more than a threshold number of errors have been detected (a threshold of 64 errors is specified in the particular example shown) and, if so, decoding of the current codeword is bypassed (skipped) as shown at 411. If there are fewer than the threshold number of errors, then at decision block 405, the erasure bit vector is evaluated to determine if no errors have been detected (e.g., whether the erasure bit vector is entirely clear) and whether a enable-bypass-if-no-error flag is set (e.g., a programmable value within the DVB receiver). If no errors have been detected and the bypass is enabled, decoding of the current codeword is bypassed as shown at 411. If negative determinations result in both decision blocks 403 and 405, RS decoding is performed at 407 and the process is repeated starting at 401 for successive codewords until the last codeword is reached as determined in decision block 409.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which logical elements may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. "Programming" of an integrated circuit device or register or other circuit therein may include, for example and without limitation, loading a control value into a register or other storage circuit within the device in response to a host instruction to control an operational aspect of the device or establish a device configuration, or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation within an integrated circuit device, the method comprising:
   receiving a sequence of data packets from an external source;
   storing data values from each of the data packets in a first memory;
   updating error descriptor values within a second memory based on error information associated with the sequence of data packets, the error descriptor values each including an address field to specify a corresponding storage region of the first memory and an error field to specify an error status of data values stored within the storage region;
   generating a sequence of multiple-bit error values based, at least in part, on the error fields and address fields within respective subsets of the error descriptor values; and
   concurrently with generating at least one multiple-bit error value of the sequence of multiple-bit error values, changing the state of one or more bits of the data values stored in the first memory based on a previously-generated multiple-bit error value of the sequence of multiple-bit error values.

2. The method of claim 1 wherein receiving a sequence of data packets from an external source comprises receiving the sequence of data packets via a broadcast transmission.

3. The method of claim 2 wherein receiving the sequence of data packets via a broadcast transmission comprises receiving a sequence of internet-protocol datagrams via a digital video broadcast transmission.

4. The method of claim 1 wherein storing data values from each of the data packets in a first memory comprises storing data values from each of the data packets in column-wise order within the first memory such that consecutive data values of an individual data packet of the data packets are stored at consecutive rows of the first memory.

5. The method of claim 1 wherein generating a sequence of multiple-bit error values according to error information and address information within respective subsets of the error descriptor values comprises generating, for each multiple-bit error value of the sequence of multiple-bit error values, an error value having a number of bits that corresponds to the number of bits in a storage row of the first memory.

6. The method of claim 5 wherein each bit of the number of bits indicates whether a corresponding bit of data within the storage row of the first memory is deemed to be in error.

7. The method of claim 1 wherein updating error descriptor values within a second memory comprises determining, for each of the error descriptor values, whether a validity field of the error descriptor value indicates that the error descriptor value contains valid error information.

8. The method of claim 7 wherein updating error descriptor values within a second memory further comprises:
   assigning a value to the validity field to indicate that the error descriptor value contains valid error information if the validity field indicates that the error descriptor does not contain valid error information; and
   recording an address of the corresponding storage region within the first memory in the address field of the error descriptor value if the validity field indicates that the error descriptor does not contain valid error information.

9. The method of claim 8 wherein updating error descriptor values within a second memory further comprises assigning a value indicative of the size of one of the data packets to a length field of the error descriptor value if the validity field indicates that the error descriptor does not contain valid error information.

10. The method of claim 1 wherein updating the error descriptor values comprises recording, within the error field of each of the error descriptor values, one of a plurality of error values that correspond to respective levels of error severity.

11. The method of claim 1 wherein changing the state of one or more bits of the data values stored in the first memory comprises:
   reading a row of data from the first memory;
   performing an error correction operation to generate an updated row of data based on at least (1) error correction information included within predetermined bit locations within the row of data read from the first memory and (2) the previously-generated multiple-bit error value; and overwriting the row of data within the first memory with the updated row of data.

12. An integrated circuit device comprising:

first and second memories;

a receiver to receive a sequence of data packets from an external source;

packet processing circuitry to store data values from each of the data packets in the first memory and to update error descriptor values within the second memory based on error information associated with the sequence of data packets, the error descriptor values each including an address field to specify a corresponding storage region of the first memory and an error field to specify an error status of data values stored within the storage region; and error correction circuitry to generate a sequence of multiple-bit error values based at least in part on the error fields and address fields within respective subsets of the error descriptor values, and, concurrently with generating at least one multiple-bit error value of the sequence of multiple-bit error values, to change the state of one or more bits of the data values stored in the first memory based on a previously-generated multiple-bit error value of the sequence of multiple-bit error values.

13. The integrated circuit device of claim 12 wherein the error correction circuitry to generate a sequence of multiple-bit error values based at least in part on the error fields and address fields within respective subsets of the error descriptor values comprises circuitry to generate, for each multiple-bit error value of the sequence of multiple-bit error values, an error value having a number of bits that corresponds to the number of bits in a storage row of the first memory.

14. The integrated circuit device of claim 13 wherein each bit of the number of bits indicates whether a corresponding bit of data within the storage row of the first memory is deemed to be in error.

15. The integrated circuit device of claim 12 wherein the packet processing circuitry to update error descriptor values within the second memory based on error information associated with the sequence of data packets comprises circuitry to determine, for each of the error descriptor values, whether a validity field of the error descriptor value indicates that the error descriptor value contains valid error information.

16. The integrated circuit device of claim 15 wherein the packet processing circuitry further comprises circuitry to (1) assign a value to the validity field to indicate that the error descriptor value contains valid error information if the validity field indicates that the error descriptor does not contain valid error information, and (2) record an address of the corresponding storage region within the first memory in the address field of the error descriptor value if the validity field indicates that the error descriptor does not contain valid error information.

17. The integrated circuit device of claim 16 wherein the packet processing circuitry further comprises circuitry to assign a value indicative of the size of one of the data packets to a length field of the error descriptor value if the validity field indicates that the error descriptor does not contain valid error information.

18. The integrated circuit device of claim 12 wherein the receiver comprises a tuner to select a broadcast transmission channel from a range of broadcast transmission channels.

19. The integrated circuit device of claim 12 wherein at least one of the packet processing circuitry and the error correction circuitry is implemented by a programmed processor.

20. An integrated circuit device comprising:

first and second memories;

means for receiving a sequence of data packets from an external source;

means for storing data values from each of the data packets in the first memory;

means for updating error descriptor values within the second memory based on error information associated with the sequence of data packets, the error descriptor values each including an address field to specify a corresponding storage region of the first memory and an error field to specify an error status of data values stored within the storage region;

means for generating a sequence of multiple-bit error values based, at least in part, on the error fields and address fields within respective subsets of the error descriptor values; and means for changing the state of one or more bits of the data values stored in the first memory concurrently with generation of at least one multiple-bit error value of the sequence of multiple-bit error values within the means for generating, wherein the means for changing the state of one or more bits of the data values is configured to change the state of the one or more bits of the data values based on a previously-generated multiple-bit error value of the sequence of multiple-bit error values.

* * * * *